(12) United States Patent
Callegari et al.

(10) Patent No.: US 12,214,612 B2
(45) Date of Patent: Feb. 4, 2025

(54) METHOD OF DESIGNING A LIGHT-REDIRECTING SURFACE OF A CAUSTIC LAYER, AN OPTICAL SECURITY ELEMENT COMPRISING THE DESIGNED LIGHT-REDIRECTING SURFACE OF THE CAUSTIC LAYER, A MARKED OBJECT, USE AND METHOD OF AUTHENTICATING THE OBJECT

(71) Applicant: SICPA HOLDING SA, Prilly (CH)

(72) Inventors: Andrea Callegari, Chavannes-près-Renens (CH); Mathieu Gillieron, Cossonay-Ville (CH); Oscar De Feo, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 768 days.

(21) Appl. No.: 17/282,983

(22) PCT Filed: Oct. 4, 2019

(86) PCT No.: PCT/EP2019/076949
§ 371 (c)(1),
(2) Date: Apr. 5, 2021

(87) PCT Pub. No.: WO2020/070304
PCT Pub. Date: Apr. 9, 2020

(65) Prior Publication Data
US 2021/0339553 A1 Nov. 4, 2021

(30) Foreign Application Priority Data
Oct. 5, 2018 (EP) .................................. 18198938

(51) Int. Cl.
*B42D 25/324* (2014.01)
*B42D 25/36* (2014.01)
*G02B 27/00* (2006.01)
*G02B 27/09* (2006.01)

(52) U.S. Cl.
CPC ........... *B42D 25/324* (2014.10); *B42D 25/36* (2014.10); *G02B 27/0012* (2013.01); *G02B 27/0927* (2013.01)

(58) Field of Classification Search
CPC .... B42D 25/324; B42D 25/36; B42D 25/351; G02B 27/0012; G02B 27/0927; G02B 3/08
See application file for complete search history.

(56) References Cited

U.S. PATENT DOCUMENTS

| 9,188,783 B2 | 11/2015 | Papas et al. |
| 2013/0301139 A1 | 11/2013 | Jarosz et al. |
| 2016/0041398 A1 | 2/2016 | Papas et al. |

FOREIGN PATENT DOCUMENTS

| AU | 2011101251 A4 | 11/2011 | |
| DE | 112016000701 T5 * | 10/2017 | ............. B42D 25/29 |

(Continued)

OTHER PUBLICATIONS

Bureau of Engraving and Printing, "History", 2008, Bureau of Engraving and Printing (Year: 2008).*

(Continued)

*Primary Examiner* — Joseph P Martinez
*Assistant Examiner* — Ray Alexander Dean
(74) *Attorney, Agent, or Firm* — Muncy, Geissler, Olds & Lowe, P.C.

(57) ABSTRACT

The invention relates to a method of designing a refractive transparent or partially transparent light-redirecting surface, or a reflective light-redirecting surface, of a caustic layer comprising providing a discrete representation of an input target image, calculating a generalized power diagram for a set of image pixels $p_i$ of the target image and computing a piecewise light-redirecting surface of the caustic layer based on a calculated optimal set of weights minimizing a cost function associated with the set of image pixels $p_i$. The (Continued)

invention also relates to an optical security element, a marked object, a method of visually authenticating an object and use of the optical security element for authenticating or securing against counterfeiting.

8 Claims, 7 Drawing Sheets

(56) References Cited

FOREIGN PATENT DOCUMENTS

| EP | 2711745 A2 | 3/2014 |
|----|------------|--------|
| EP | 2963464 A1 | 1/2016 |
| JP | 2019506704 | 3/2019 |
| JP | 2019518996 | 7/2019 |
| WO | 2017199568 | 11/2017 |
| WO | 2018074096 | 4/2018 |

OTHER PUBLICATIONS

Nelder, J.A et al., "A simplex method for function minimization", The Computer Journal, vol. 7, Issue No. 4, 1965, pp. 308-313.

Wright, Stephen J., "Coordinate Descent Algorithms", Mathematical Programming, vol. 151, Issue No. 1, Jun. 2015, pp. 3-34.

Huyer, W. et al., "Global Optimization by Multilevel Coordinate Search", Journal of Global Optimization, vol. 14, Issue No. 4, Jun. 1999, pp. 331-355.

Press, WH; et al. "Section 10.5. Downhill Simplex Method in Multidimensions" (The Book States Downhill Simplex Method in Multidimensions in Section 10.4), 2007, 31 pages.

Numerical Recipes: The Art of Scientific Computing (3rd ed.). New York: Cambridge University Press, 2007, ISBN 978-0-521-88068-8, 20 pages.

Goes, F. de et al., "Blue Noise through Optimal Transport", CAN Transactions on Graphics, vol. 31, Issue No. 6, SIGGRAPH, Asia, 2012, 10 pages.

Goes et al., "Blue Noise Through Optimal Transport," obtained on Feb. 22, 2021 online from http://www.geometry.caltech.edu/BlueNoise/, 2 pages.

International Search Report and Written Opinion issued with respect to application No. PCT/EP2019/076949.

Japan Patent Office Action in counterpart Japanese Application No. JP 2021-517830 dated May 9, 2023 (and English language translation of Office Action), 14 pages.

\* cited by examiner

METHOD OF DESIGNING A LIGHT-REDIRECTING SURFACE OF A CAUSTIC LAYER, AN OPTICAL SECURITY ELEMENT COMPRISING THE DESIGNED LIGHT-REDIRECTING SURFACE OF THE CAUSTIC LAYER, A MARKED OBJECT, USE AND METHOD OF AUTHENTICATING THE OBJECT

TECHNICAL FIELD

The present invention relates to the technical field of designing caustic optical elements, in particular to designing a refractive transparent or partially transparent light-redirecting surface (or a reflective light-redirecting surface) of a caustic layer, and to refractive or reflective optical security elements operable to project caustic patterns upon appropriate illumination.

BACKGROUND ART

There is a need for security features on objects, that can be authenticated by the so-called "person in the street", using commonly available means. These means include using the five senses—mostly, sight and touch—plus using widespread tools, such as for example a mobile phone.

Some common examples of security features are forensic fibers, threads or foils (incorporated into a substrate like paper for example), watermarks, intaglio printing or micro-printing (possibly printed on a substrate with optically variable inks) which can be found on banknotes, credit cards, ID's, tickets, certificates, documents, passports etc. These security features can include optically variable inks, invisible inks or luminescent inks (fluorescing or phosphorescing under appropriate illumination with specific excitation light), holograms, and/or tactile features. A main aspect of a security feature is that it has some physical property (optical effect, magnetic effect, material structure or chemical composition) that is very difficult to counterfeit so that an object marked with such a security feature may be reliably considered as genuine if the property can be observed or revealed (visually or by means of a specific apparatus).

However, when the object is transparent, or partially transparent, these features may not be appropriate. In fact, transparent objects often require that the security element having the required security features does not change their transparency or their appearance, either for aesthetic or for functional reasons. Notable examples may include blisters and vials for pharmaceutical products. Recently, for example, polymer and hybrid banknotes have incorporated in their design a transparent window, thus generating the desire for security features that are compatible with it. Whilst the transparency argument does not apply to reflective caustics, the approach extends naturally to reflective caustics where, for instance, the use case requires preserving the appearance of polished mirror-like surfaces.

Most existing security features for documents, banknotes, secured tickets, passports, etc. have not been specifically developed for transparent objects/areas and, as such, are not well-suited for such an application. Other features, for example, those obtained with invisible and fluorescent inks require specific excitation tools and/or detection tools, which may not be readily available for "the person in the street".

Semi-transparent optically variable features (e.g. liquid crystal coatings, or latent images from surface structures) are known and can provide this kind of functionality. Unfortunately, the marking incorporating such security features generally must be observed against a dark/uniform background for the effect to be well visible.

Other known features are diffractive optical elements, such as non-metallized surface holograms. A disadvantage with these features is that they show a very low contrast visual effect when viewed directly. Furthermore, when used in combination with a monochromatic light source to project a pattern, they typically require a laser to give a satisfactory result. Moreover, a quite precise relative spatial arrangement of the light source, the diffractive optical element and the user's eyes is required in order to provide a clearly visible optical effect.

Laser engraved micro-text and or micro-codes have been used for e.g. glass vials. However, they require expensive tools for their implementation, and a specific magnifying tool for their detection.

Accordingly, in order to solve the problems existing in the prior art, many further attempts have been made to develop optical security elements suitable for transparent or partially transparent objects.

One of possible approaches is introducing a design methodology that uses a caustic layer having a refractive transparent or partially transparent light-redirecting surface, or a reflective light-redirecting surface, wherein the caustic layer has a relief pattern adapted to redirect incident light received from a light source and to form a projected image containing a caustic pattern. The approach extends naturally to the use of a reflective light-redirecting surface, in the case of opaque objects with a mirror-like surface.

This approach allows controlling the caustic pattern by shaping the surface of the caustic layer. The computational tools based on light transport have been developed to form almost any desired shape by optimizing (calculating) the geometry of the refractive or reflective surface of caustic optical elements starting from a target image.

In an ideal workflow, calculating a suitable surface starting from a target image should be fast and applicable to a broad range of target images, should not require unduly heavy computational resources, and should not require user intervention beyond that of choosing and providing the target image.

Methods for calculating a caustic surface starting from a target image have been disclosed in the prior art.

EP2711745 A2 discloses discretizing the generated surface into a mesh, which is then deformed to adjust the brightness of the corresponding area of the image. The normal field associated with the mesh is then determined and integrated to find the corresponding caustic surface. However, given an arbitrary image, there is no guarantee that the corresponding normal field will be integrable, and additional precautions must be taken to ensure the same.

EP2963464 A1 takes a similar approach to determine an optimal transport map (OTM) and likewise requires calculating and integrating a normal field that is not guaranteed to be integrable.

U.S. Pat. No. 9,188,783B2 and US2016041398 divide the generated surface into a collection of micro-patches, each responsible for projecting a caustic Gaussian kernel, wherein the superposition of the kernels approximates the desired image. However, as noted also in EP2711745 A2, the method suffers from discretization artifacts and has difficulties in resolving low intensity regions. The normal field also needs to be integrated.

In all these cases, the actual image projected by the calculated caustic surface is finally simulated by raytracing; image adjustment of the target figure may be required, when the caustic pattern does not approximate the target image with sufficient fidelity. This requires extra time and efforts and still cannot guarantee complete accuracy of the obtained caustic pattern.

It is therefore an object of the present invention to provide a method for designing a refractive transparent or partially transparent light-redirecting surface, or a reflective light-redirecting surface, of a caustic layer that is fast, scalable, reliable and accurate. This enables to significantly reduce the total time required to go from a target image to the corresponding surface, since fewer iterations due to corrections or adjustments are required, and iterations are faster. This also reduces the overall time required for designing.

It is a further object of the present invention to eliminate a step of calculating and integrating the normal field. Eliminating the need to integrate the normal field removes one of the major constraints and sources of inaccuracies of the previously known methods.

It is a further object of the present invention to reduce or fully eliminate user intervention beyond that of specifying the target image and accepting the resulting surface. Removing the need for user intervention significantly simplifies the implementation of the method in the context of a production workflow, where specialized skills are not necessarily available.

It is a further object of the present invention to provide optical security elements operable to project caustic patterns upon appropriate illumination, which are suitable for transparent or partially transparent objects, and for reflective objects.

It is a further object of the present invention to provide a marked object, selected from a group comprising consumer products, value documents and banknotes, which comprises the optical security element.

It is a further object of the present invention to provide a method of visually authenticating an object, marked with an optical security element using commonly available means.

It is a further object of the present invention to use the optical security element for authenticating or securing against counterfeiting an object selected from the group comprising consumer products, value documents and banknotes.

SUMMARY OF THE INVENTION

According to one aspect, the present invention relates to a method of designing a refractive transparent or partially transparent light-redirecting surface, or a reflective light-redirecting surface, of a caustic layer adapted to redirect incident light received from a light source and to form a projected image containing a caustic pattern, the method comprising computer implemented steps of:

providing a discrete representation of an input target image comprising a set P of N image pixels $p_i$ of coordinates $\{(x_i,y_i)\}$ in the image plane with associated nonzero target light intensities $\{I_i\}$, i=1, ..., N, distributed within a given area of the target image and corresponding to a target caustic pattern of the target image;

computing a piecewise representation of the light-redirecting surface z=F(x,y) of the caustic layer, with height z above the (x,y) coordinates plane, based on a representation of the light-redirecting surface by means of intersecting pieces of surfaces $z=f_i(x,y)$, i=1, ..., N, respectively obtained from the stationarity of the optical path length of rays refracted, or reflected, by the caustic layer and focused on points P(i) of the image plane of coordinates $(x_i,y_i)$, i=1, ..., N, wherein each piece of surface $z=f_i(x,y)$ is a surface of revolution around an axis passing through the point P(i) and having a vertex at point $(x_i, y_i, z_i)$, with height $z_i=f_i(x_i, y_i)$, i=1, ..., N, the piecewise representation of the light-redirecting surface associated with respective values of the heights of the N vertices being formed by an envelope of the intersections of the corresponding N pieces of surfaces $z=f_i(x,y)$, i=1, ..., N;

for a given set of respective values of heights $z_1, ..., z_N$ of the vertices of the N pieces of surfaces, calculating a corresponding set of values of light intensities I(1), ..., I(N) which are respectively focused on the points P(1), ..., P(N) by the caustic layer redirecting incident light via the associated piecewise light-redirecting surface; and calculating the respective values of the N heights $z_1, ..., z_N$ of the N vertices of the corresponding N pieces of surfaces which minimize the differences between the respective values of calculated light intensities I(1), ..., I(N) focused on the points P(1), ..., P(N) via the associated light-redirecting surface and the respective corresponding values of the target light intensities $I_1, ..., I_N$, thereby obtaining the light-redirecting surface having a relief pattern adapted to redirect incident light received from the light source and form a projected image containing the target caustic pattern of the target image.

According to the invention, each piece of surface $z=f_i(x,y)$, i=1, ..., N, may be approximated by taking, within the paraxial approximation, a Taylor expansion of order k greater or equal than two of the expression of the piece of surface obtained from the stationarity of the optical path length.

In the above method, the step of calculating the heights $z_i$ minimizing the differences between the calculated light intensities I(i) and the corresponding target light intensities $I_i$, for i=1, ..., N, may be performed by means of a gradient-free optimization method. These methods have the advantage of simplicity at the price of a high computational cost.

Preferably, the step of calculating the heights $z_i$ minimizing the differences between the calculated light intensities I(i) and the corresponding target light intensities $I_i$, for i=1, ..., N, may be performed by means of a (capacity constrained) power diagram method associated with an optimization method that may be gradient-free or, preferably, gradient-based (in order to reduce the computational cost).

In a further aspect of the present invention, the designed light-redirecting surface is used to generate a machine-compatible representation for machining purpose, for example, using the industry standard formats such as STereoLithography (STL) or Initial Graphics Exchange Specification (IGES). Particularly, the machine-compatible representation may be used for controlling a machining tool so as to machine a light-redirecting surface of an optical material substrate, or an intermediate substrate further used for mass production of caustic optical elements by replication.

In a further aspect of the present invention, the designed light-redirecting surface is a master light-redirecting surface to be used to build a replica of the light-redirecting surface. In this case, the method can further comprise replicating the light-redirecting surface on a substrate. Such replicating can comprise one of roll-to-roll, foil-to-foil, UV casting, and embossing.

In another aspect, the present invention provides an optical security element comprising at least one of refractive or reflective light-redirecting surface of a caustic layer that is designed according to the method as described above. Said optical security element can mark an object selected from the group comprising: consumer products, value documents, identity documents, tax stamps, and banknotes.

In another aspect, the present invention provides a marked object, selected from a group comprising consumer products, value documents and banknotes, which comprises the optical security element as described above.

In another aspect, the present invention provides a method of visually authenticating an object, marked with an optical security element, by a user, comprising the steps of:
- illuminating the light-redirecting surface of the optical security element with a point-like light source at the distance $d_s$ from the light-redirecting surface;
- visually observing the caustic pattern projected on a projection surface at distance $d_i$ from the optical security element; and
- deciding that the object is genuine upon evaluation by the user that the projected caustic pattern is visually similar to the reference pattern.

In yet another aspect, the present invention provides a use of the optical security element as described above, for authenticating or securing against counterfeiting an object selected from the group comprising consumer products, value documents, identity documents, tax stamps, and banknotes.

The present invention will be described more fully hereinafter with reference to the accompanying drawings, in which prominent aspects and features of the invention are illustrated.

DETAILED DESCRIPTION

Figure 1:
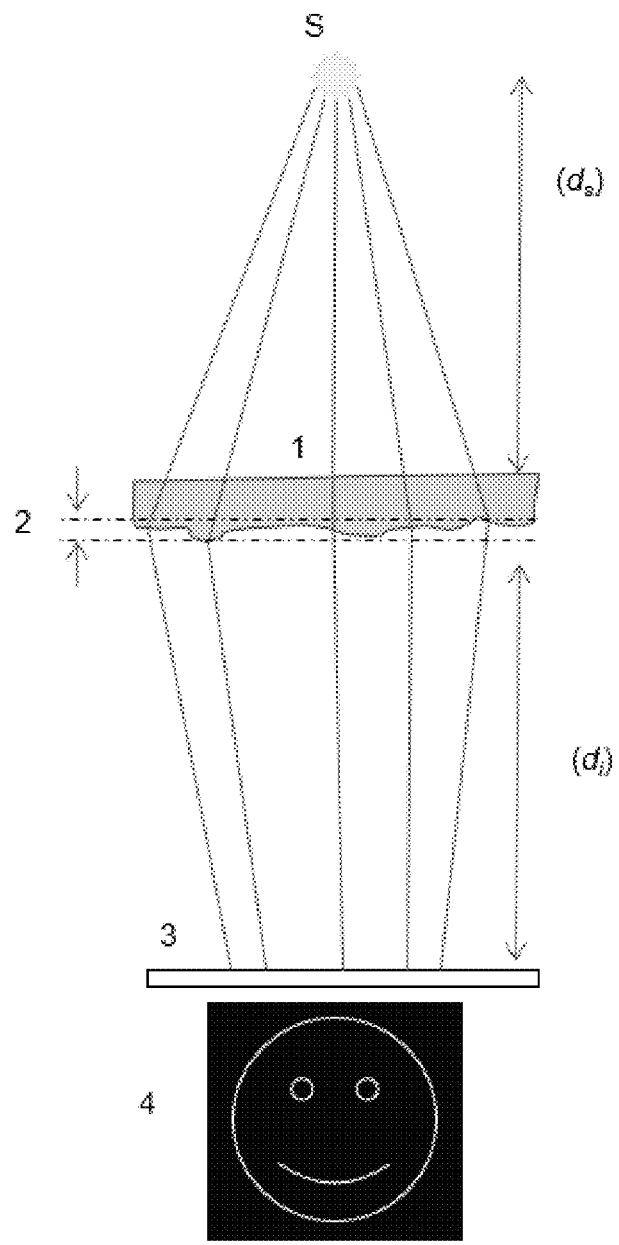
FIG. 1 is a schematic illustration of typical optical configuration of a refractive optical security element for projecting of a caustic image.

In optics, the term "caustic" refers to an envelope of light rays refracted or reflected by one or more surfaces, at least one of which is curved, as well as to projection of such light rays onto another surface. More specifically, a caustic is the curve or surface tangent to each light ray, defining a boundary of an envelope of rays as a curve of concentrated light. For example, the light pattern formed by sunrays at the bottom of a pool is a caustic "image" or pattern formed by a single light redirecting surface (the wavy air-water interface), whereas light passing through the curved surface of a water glass creates a cusp-like pattern on a table which the water glass is resting as it crosses two or more surfaces (e.g. air-glass, glass-water, air-water) which redirect its path.

In the following, the most common configuration where the (refractive) caustic layer of an optical security element is bound by one curved surface, or light-redirecting surface, and one flat surface will be used as an example, without restricting the more general cases. It will be here referred to a more general "caustic pattern" (or "caustic image") as the light pattern formed onto a screen (projection surface) when a suitably shaped optical surface (with a light-redirecting surface having an appropriate relief pattern) of the caustic layer redirects light from a source to divert it from some regions of the screen, and concentrates it on other regions of the screen in a pre-determined light pattern (i.e. thus forming said "caustic pattern"). Redirection refers to the change of path of light rays from the source in the presence of the caustic layer with respect to the path from the source to the screen in the absence of the caustic layer. A caustic layer (refractive or reflective) is thus a piece of an optical material having a light-redirecting surface with a relief pattern adapted to redirect light received from a light source to form a caustic image. An optical security element according to the invention includes a caustic layer, and may further comprise additional optical element(s) (e.g. lens, or support substrate) participating to light redirection.

In turn, the curved optical surface will be referred to as "relief pattern", and the optical element that is bound by this surface will be referred to as caustic layer. It should be noted that the caustic pattern may be the result of redirection of light by more than one curved surface and more than one object, although possibly at the price of increased complexity. Moreover, a relief pattern for generating a caustic pattern must not be confused with a diffractive pattern (like, for example, in security holograms).

The concept of the present invention may be for example applied to common objects, such as consumer products, ID/credit cards, banknotes, and so on. To do so, it is required drastically shrinking down the size of an optical security element, and in particular bringing the relief depth of the relief pattern below acceptable values. To this aim, having an efficient workflow is particularly useful as it allows several design iterations until all operational constraints are met.

In this description under "relief" should be understood the existence of a height difference (as measured along an optical axis of the optical security element) between the highest point and lowest point of a surface, in analogy with the difference of altitude between the bottom of a valley and the top of a mountain (i.e. as "peak to valley" scale). While the method according to the invention is not limited to a specific relief, for many of the applications contemplated the maximum depth of the relief pattern of the optical security element is typically less or equal than 250 µm or more preferably less or equal than 30 µm, while being above the limit imposed by ultra-precision machining (UPM) and reproduction process, i.e. about 0.2 µm.

According to this description, the height difference between the highest and lowest point in the relief pattern on the light-redirecting surface is referred to as relief depth E.

A caustic pattern (image), forming an approximation of a digital image, should be understood as a light pattern projected by an optical security element, when illuminated by a suitable point-like source. As mentioned above, the optical security element should be understood as the slab of refractive material responsible for creating the caustic image.

A light-redirecting surface(s) is the surface (or surfaces) of the caustic layer (of an optical security element) responsible for redirecting the incoming light from a source onto a screen, or (preferably flat) projection surface, where the caustic pattern is formed.

An optical material substrate, used to make an optical (security) element, is a raw material substrate from which a surface is specifically formed so as to have a relief pattern and thus to form a light-redirecting surface. In case of a reflective light-redirecting surface, the optical material substrate is not necessarily homogeneous or transparent; the same applies into the case of a master surface only used for further replication. For example, the material may be opaque to visible light, and reflectivity may be obtained by classical metallization of the formed surface. In case of a refractive light-redirecting surface, the raw material substrate is transparent (or partially transparent) and homogeneous with a refractive index n (for photons of the spectrum visible to a human eye), and the corresponding light-redirecting surface is named as the "refractive transparent or partially transparent light-redirecting surface of refractive index n".

A master light-redirecting surface according to this description is the first physical realization of a light-redirecting surface from the calculated one. It can be replicated into several copies (tools) which are then used for mass replication.

A point-like source as used in this description is a source of light whose angular size (from the point of view of the optical security element), is sufficiently small that light can be considered to arise from a single point at a distance $d_s$ from the light-redirecting surface. As a rule of thumb, this means that the quantity: (source diameter)$\times d_i/d_s$, is smaller than the desired resolution (e.g. 0.05-0.1 mm) of the target caustic pattern on a projected image on the projection surface at a distance $d_i$ from the light-redirecting surface (see FIG. 1). The screen should be understood as the surface on which the caustic pattern is projected. The distance between source and the light-redirecting surface is also named as source distance $d_s$ and the distance between the light-redirecting surface and the screen is named as image distance $d_i$.

The term tool (or replication tool, when it is necessary to remove ambiguity) is mainly used for the physical object carrying the profile of a light-redirecting surface that is used for mass replication. It can be used for example to produce a copy of a master light-redirecting surface (the original relief being reproduced, by embossing or injection, from the master carrying the corresponding inverted relief). For the tool used to machine the relief pattern of the light-redirecting surface, the term machining tool is used to remove ambiguity.

FIG. 1 provides a schematic illustration of typical optical configuration of a refractive optical security element for projecting a caustic image. An optical security element (1) including a caustic layer having refractive surface redirects light from a point-like source S and projects it onto a suitable screen (3), which can be any surface of any object, etc., where a meaningful image is formed, as shown in FIG. 1. A special design of the light-redirecting surface may allow projecting a (recognizable) caustic pattern on a curved surface. The image can be for example a logo, a picture, a number, or any other information that may be relevant in a specific context. Preferably, the screen is a flat projection surface or a flat part of any object.

The configuration of FIG. 1 shows that light from a source S is redirected by a suitably shaped optical surface having a relief pattern (2). This general idea is for example known from reflective surfaces for car headlights, reflectors and lenses for LED illumination, optical systems in laser optics, projectors and cameras. However, usually, the goal is to transform a non-homogeneous distribution of light into a homogeneous one. By contrast, a goal of the present invention is to obtain a non-homogeneous light pattern, i.e. a caustic pattern, which (approximately) reproduces some regions of relative brightness of a reference pattern (as represented on a (digital) reference image). If the illuminated relief pattern (2) of the optical element allows forming a caustic pattern (4) on the screen (3) reproducing with sufficient quality (possibly differing by an overall intensity scaling factor) a known reference pattern, then a person visually observing the caustic pattern on the screen will easily see if it constitutes or not a valid reproduction of the reference pattern and, in case the caustic pattern is similar enough to the reference pattern, will consider that the object marked with the optical security element is (with strong likelihood) genuine.

According to the embodiment of FIG. 1 light rays from a light source S, which is a point-like source according to this example, propagate to an (refractive) optical security element (1) (caustic layer) at a source distance $d_s$ with a light-redirecting surface having a relief pattern (2). The optical security element is here made of a transparent or partially transparent homogeneous material of refractive index n. The caustic pattern (4) is projected on the screen (3) at an image distance $d_i$ from the light-redirecting surface of the optical security element (1). Authenticity of the optical security element (and thus, that of the object marked with this security element) can be evaluated directly by visually checking a degree of resemblance between the projected caustic pattern and the reference pattern.

Preferably, the relief pattern (2) is calculated starting from a specified target digital image. From that calculated relief pattern, a corresponding physical relief pattern can be created on a surface of suitable optical material substrate (e.g. a transparent or partially transparent material of refractive index n, or a reflective surface of opaque material), using Ultra Precision Machining (UPM). In case of machining a relief on a surface of an opaque optical material substrate to form a reflective surface, a good reflectivity will be obtained either by the suitable properties of the material itself, or by a further conventional operation of depositing a thin layer of metal (metallizing) on the relief. UPM uses diamond machining tools and nanotechnology tools to achieve very high accuracy so that the tolerances can reach "sub-micron" level or even nano-scale level. In contrast to this, "High Precision" in traditional machining refers to tolerances of microns in the single-digits. Other potentially suitable techniques to create a physical relief pattern on a surface are laser ablation, and grayscale lithography. As known in the domain of micro-fabrication, each of these techniques has different strengths and limitations, in terms of cost, precision, speed, resolution, etc.

A suitable optical material substrate for a refractive light-redirecting optical element should be optically clear, transparent or at least partially transparent, and mechanically stable. Typically, a transmittance T 50% is preferred, and T 90% is most preferred. Also, a low haze H 10% can be used, but H 3% is preferred and H 1% is most preferred. The optical material should also behave correctly during the machining process, so as to give a smooth and defect-free surface. An example of a suitable substrate is an optically transparent slab of PMMA (also known under the commercial names of Plexiglas, Lucite, Perspex, etc.). For reflective caustic light-redirecting optical elements, a suitable optical material substrate should be mechanically stable, and it should be possible to give it a mirror-like finish. An example of a suitable substrate is a metal, such as those used for masters of ruled gratings, and laser mirrors, or a non-reflective substrate which can be further metallized.

For large scale production, further steps of tool creation and mass replication of the optical security element on a target object are required. A suitable process for tool creation from a master is, e.g. electroforming. Suitable processes for mass replication are, e.g. hot embossing of a polymer film, or UV casting of a photo-polymer, and these can be further implemented either in a roll-to-roll or a foil-to-foil process. For the purpose of mass replication, neither the master nor the tool derived from it need to be optically transparent, hence opaque materials (notably, metals) can also be used even when the final product is a refractive optical element. Nevertheless, in some cases it might be advantageous that the master is transparent, as it allows checking the quality of the caustic image before proceeding with tooling and mass replication.

A critical aspect for the use of optical elements (with light-redirecting surface having relief pattern) as security features is their physical scale, which must be compatible with the target object, and the optical configuration required to project the caustic image.

In general, the maximum lateral size is limited by the overall size of the object and may usually range from a few cm to less than 1 cm in less favorable cases. For certain uses, like for example for banknotes, the targeted overall thickness can be extremely small (of the order of 100 µm or less). Furthermore, admissible thickness variations (relief) are even smaller, for a variety of reasons, including mechanical constraints (weak spots associated with the thinner areas) and operational considerations (e.g. when stacking-up banknotes, the pile will bulge corresponding to the thicker portion of the bill, which complicates handling and storage). Typically, for a banknote of overall thickness of about 100 µm, a target thickness for the relief pattern of an optical security element to be included in this banknote may be of about 30 µm. For a credit card or an ID card of about 1 mm thickness, a target thickness for the relief pattern of an optical security element to be included in this credit/ID card will be less than about 400 µm and preferably no more than about 250 µm.

Furthermore, the source- and image-distance, are generally limited by user comfort to a few tens of centimeters. Notable exceptions are the sun or a spot light mounted on the ceiling, which however are less readily available under certain circumstances. Also, the ratio ds/di between the two distances is typically larger than 5 to 10, so as to obtain a sharper image (and with good contrast) that is easier to recognize. Moreover, the ratio $d_s/d_i \geq 5$ together with a light source S being preferably point-like (e.g. illumination LED of a conventional mobile phone) allows considering that the light source is in fact approximately "at infinity" and thus, a projection surface at only approximately the focal distance from the optical security element will be suitable for a clear viewing of a projected caustic pattern. As a consequence, the conditions of good visual observation by a user do not require a too strict relative spatial arrangement of the light source, the optical security element and the user's eyes.

In general, thickness and relief are among the most critical parameters. Given an arbitrary target image (reference pattern) and optical geometry configuration (i.e. geometric conditions for illumination/observation of the projected caustic pattern), there is no guarantee that the calculated optical surface will have a relief pattern below a prescribed limit. In fact, in the general case, the opposite is likely to happen: this is particularly true with the severe imposed constraints for optical security elements described above. The proposed method does not account automatically for these additional constraints. However, because it can quickly compute a caustic surface corresponding to a given input image, it allows for several iterations on the image design till the designed relief is compatible with the constraints. By contrast, computationally expensive conventional methods usually not only do not account automatically for the constraints but also impose severe limitations on an iterative design process.

Although only the configuration for a transmissive caustic optical element is described here, the same reasoning can be applied to a reflective configuration, with only minor changes (particularly, concerning the application of Fermat's principle).

Figure 2:
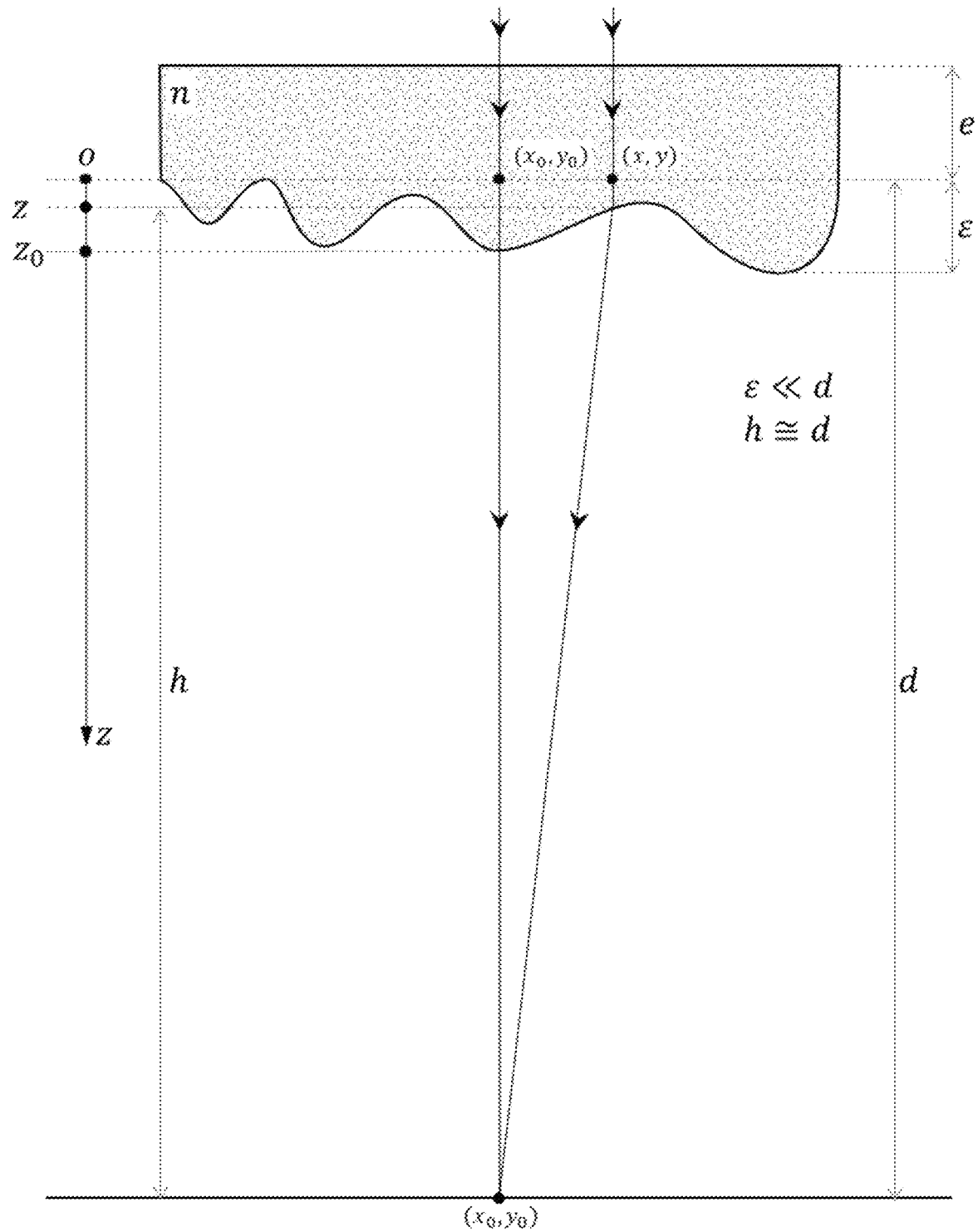
FIG. 2 illustrates a caustic surface for a single image pixel (image point).

For the purpose of description, it is convenient to define a Cartesian reference frame, with the z axis aligned with the optical axis (perpendicular to the caustic optical element), and pointing from the source to the image. In order to illustrate the concept of the invention a simple caustic optical element of "plano-convex" type is considered (FIG. 2-3) and is illuminated with a beam of (substantially) parallel rays. Extension to the case of a light source at finite distance being straightforward by the addition of a lens-like optical element, transforming the finite-distance source into a virtual source at infinity. The function of the lens-like element may eventually be incorporated directly in the caustic optical element. The x and y axes thus lie on the plane of the caustic optical security element (that is parallel to the entry face of the caustic optical element). The caustic surface is mathematically described by a scalar function $z=F(x,y)$, giving the distance z of the surface from a reference plane $z=0$ at a point of coordinates (x,y) of the caustic optical element. For the purpose of convenience in the subsequent description, this plane can be located at the back surface of the caustic optical element, in which case $z=F(x,y)$ is equal to the thickness of the caustic optical element (see FIG. 2). In the example shown on FIG. 2, this plane is parallel to the plane of the caustic image.

Likewise, the caustic image is described by a scalar function I(x',y'), giving the luminous intensity at a point (or pixel) of coordinates (x',y') on the image plane.

It should be noted that the use of Cartesian coordinates is a matter of convenience, and other systems may also be used instead (e.g. in the case where the caustic surface is part of or supported by a curved object). Likewise, the back surface of the caustic optical element need not be flat, although obviously this must be kept into account in the calculations.

The present invention utilizes the property that light travels along paths of stationary optical length, where the optical path length is a local extremum with respect to any small variation in the path (Fermat's principle). For any given point $(x_0, y_0)$ of the caustic image, a bundle of rays of small cross-section converging on it have traveled paths of the same optical length. Typically, a relief pattern of a light redirecting surface of a caustic layer has a relief depth ε very small compared to the distance d between the caustic layer and the image plane on which the caustic image is formed (see FIG. 2): indeed, generally a resulting value of ε is less than 300 µm while d is greater than 5 cm (thus, $\varepsilon/d < 6 \cdot 10^{-3}$), the relief depth ε being defined as the height difference between the highest and the lowest point of the relief pattern. The overall thickness of the caustic layer is (e+ε) where e is the thickness of the homogeneous part of the optical material of the caustic layer. Generally, the thickness e is also very small compared to the observation distance d, i.e. typically e is less than a millimeter (thus, $e/d \leq 2 \cdot 10^{-2}$, and $(e+\varepsilon)/d \leq 2.6$ $10^{-2}$). However, the layer of thickness e, corresponding to a propagation of incoming light rays within the caustic layer as mere parallel rays, has no effect regarding a difference of optical path and thus will be disregarded. Considering the caustic layer illustrated on FIG. 2, for a light source located at infinity (for simplicity, so that we have parallel incoming rays), ($s_i=\infty$, $d_i=d$), we consider a difference of optical path length $\Delta l$ between (i) an optical path length $l(x_0, y_0)$ of a straight ray entering the plane face (at level z=0) of the caustic layer, at point ($x_0, y_0$), passing through the caustic layer (caustic optical element) of refractive index n up to the point ($x_0, y_0$) at level $z_0$ of the light-redirecting surface of equation $z=F(x,y)$, and reaching the focus point ($x_0, y_0$) of the image plane, and (ii) an optical path length $l(x,y)$ of a ray entering the plane face (at level z=0) of the caustic layer, at point (x,y) close to the point ($x_0, y_0$), passing through the caustic layer up to the point (x,y) at level z of the light-redirecting surface, and deflected to the point ($x_0, y_0$) of the image plane. If r is the distance between the points ($x_0, y_0$) and (x,y), i.e. $r=\sqrt{(x-x_0)^2+(y-y_0)^2}$, we have:

$$\Delta l = l(x_0,y_0) - l(x,y) = n(z_0-z) + (d-z_0) - \sqrt{r^2+(d-z)^2},$$

According to the Fermat's principle, we must have $\Delta l=0$, and thus, solving the quadratic equation in z, we obtain:

$$\frac{z_0 - z}{d - z_0} = \frac{1}{n+1}\left(\sqrt{1 + \frac{r^2}{(d-z_0)^2}\frac{n+1}{n-1}} - 1\right),$$

wherein, in view of $\varepsilon \ll d$, we have $d-z_0 \approx d$. Hence, said $z=f_0(x,y)$ designating a local representation of the surface $z=F(x,y)$ (i.e. around the point ($x_0, y_0$)), and $z_0=f_0(x_0, y_0)$ being the quote at the vertex, we can write:

$$z = f_0(x, y) = f_0(x_0, y_0) + \frac{d}{n+1}\left[1 - \sqrt{1 + \frac{n+1}{n-1}\left(\frac{r}{d}\right)^2}\right],$$

which represents a surface of revolution around the z axis with a vertex at point ($x_0, y_0, z_0$).

Consequently, if instead of the focus point ($x_0, y_0$) we consider any one of the focus points ($x_i, y_i$) on the image plane (i=1, ..., N) we can define a local (i.e. with vertex at point ($x_i, y_i$)) approximation of $F(x,y)$ by:

$$z = f_i(x, y) = f_i(x_i, y_i) + \frac{d}{n+1}\left[1 - \sqrt{1 + \frac{n+1}{n-1}\left(\frac{r_i}{d}\right)^2}\right],$$

wherein $z_i=f_i(x_i,y_i)$, and $r_i=\sqrt{(x-x_i)^2+(y-y_i)^2}$. Hence, the function F(x,y) giving the overall shape of the light-redirection surface of a caustic layer, can be locally represented, consistently with the above mentioned stationarity of the optical path, by a piecewise surface being the envelope resulting from the intersections of pieces of surfaces having "elementary shape functions" $z=f_i(x,y)$ around vertices ($x_i, y_i$) corresponding to given points ($x_i,y_i$), i=1, ..., N, on the image plane.

The invention further stems from the observation that, in the paraxial approximation, i.e. with $r \ll d$, and thus with $$\delta_i = \left(\frac{r_i}{d}\right)^2 \ll 1,$$

this local representation of the caustic surface can be further approximated in a vicinity of ($x_i,y_i$) with the first few non-zero terms of the Taylor expansion of the expression within the square brackets:

$$1 - \sqrt{1 + \frac{n+1}{n-1}\delta_i^2} \approx -\frac{n+1}{2(n-1)}\delta_i^2 + \frac{(n+1)^2}{8(n-1)^2}\delta_i^4 + \ldots.$$

Figure 3:
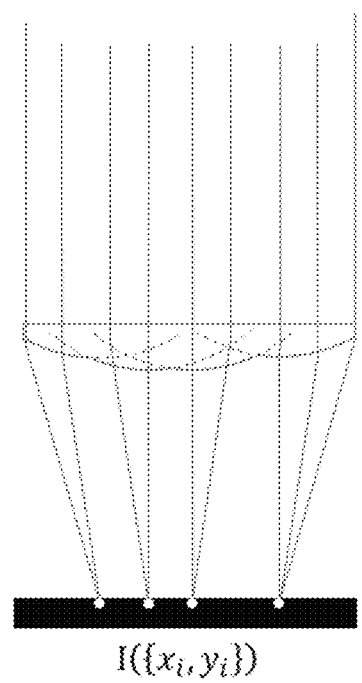
FIG. 3 illustrates a caustic surface for multiple image pixels (image points).

For example, if we consider the local approximation $f_i(x,y)$ of F(x,y) around a point ($x_i,y_i$) and account only for the first non-zero term of the Taylor expansion, we obtain the simplified approximation of the local representation:

$$f_i(x, y) \approx f_i(x_i, y_i) - \frac{d}{2(n-1)}\left(\frac{r_i}{d}\right)^2,$$

which describes a paraboloid of revolution with axis centered at ($x_0, y_0$), as shown in FIG. 3, with a "height" $z_i=f_i(x_i,y_i)$ with respect to the (x,y) plane at z=0 and corresponding to the vertex of the paraboloid (of spatial coordinates ($x_i,y_i,z_i$)).

For a Taylor expansion to the next non-zero order (k=4), we obtain the approximation of the local representation around a point ($x_i,y_i$) as:

$$z = f_i(x, y) \approx f_i(x_i, y_i) - \frac{d}{2(n-1)}\left(\frac{r_i}{d}\right)^2 + \frac{d(n+1)}{8(n-1)^2}\left(\frac{r_i}{d}\right)^4.$$

When considering the piecewise paraboloid approximation of F(x,y) given by the approximation up to the first non-zero order of the local representation $f_i(x,y)$, the intersection of two such (circular) paraboloids having respectively height $z_i$ above a point ($x_i,y_i$) and height $z_j$ above an adjacent point ($x_j, y_j$) generally defines a parabola in a plane perpendicular to the straight line joining the two points ($x_i,y_i$) and ($x_j, y_j$). Thus, for a set of points {($x_i,y_i$), i=1, ..., N} of the image plane, and a corresponding set of heights {$z_i$, i=1, ..., N}, of the vertices of the paraboloids respectively associated with said points, the resulting (outer) envelope of the intersection of these paraboloids (defining a piecewise light-redirecting surface) is formed of portions of paraboloids bounded by sharp parabolic curves. These curves can be calculated by solving mere algebraic equations of order two. In case of a Taylor expansion of order k=4 or higher, the corresponding "elementary shape functions" $z=f_i(x,y)$ are more complex than mere paraboloids and the calculation of the lines of intersection of the pieces of surfaces (when setting different heights of their vertices) becomes more laborious.

In the example shown on FIG. 3, the incoming parallel rays illuminate the plane (entry) face z=0 of the caustic layer with a uniform intensity Io and thus, for a given piecewise approximation of the light redirecting surface z=F(x,y), i.e. for a given set of N vertices ($x_i,y_i,z_i$) and corresponding elementary shape functions $f_i(x,y)$, i=1, ..., N, the contribution to intensity I(j) at point ($x_j, y_j$) of the image plane from the envelope of the intersections of the elementary pieces of surface can be mathematically described by:

$$I(j) = \int\int I_0 \prod_{i=1, i\neq j}^{N} H[f_j(x, y) - f_i(x, y)]dxdy,$$

using the "trace function" (i,j belong to $\{1, \ldots, N\}$):

$$\prod_{i=1, i \neq j}^{N} H[f_j(x, y) - f_i(x, y)],$$

wherein the function H[X] is the conventional Heaviside step function defined by $$H(X) = \begin{cases} 0, & X < 0 \\ 1, & X \geq 0 \end{cases},$$

and where the integrals are taken over the supporting domain of the caustic element (i.e. "window" or light collection area). Notice that there are, in principle, no specific limitations to the shape and/or size of the window. However, simple geometrical shapes, compact shapes, and convex shapes are advantageous for computational and practical purposes.

The expression of the piecewise approximation (for a given number N of image points $(x_i,y_i)$, $i=1, \ldots, N$) of the representation of the caustic surface $z=F(x,y)$ is thus given by:

$$F(x, y) \sim \sum_{j=1}^{N} f_j(x, y) \prod_{i=1, i \neq j}^{N} H[f_j(x, y) - f_i(x, y)].$$

Once a piecewise approximation of the light-redirecting surface $z=F(x,y)$ is obtained (for a given set of N vertices), it is necessary to estimate the corresponding distribution of light intensity I(i), $i=1, \ldots, N$ at the selected respective points $(x_i,y_i)$, $i=1, \ldots, N$, of the image plane, and estimate the difference for each target point $(x_i,y_i)$ between I(i) and the given (target) intensity $I_i$ at same point corresponding to the target caustic pattern to be reproduced. Thus, the heights $z_i$, $i=1, \ldots, N$ of the vertices are iteratively set so that the sum $S=\Sigma_{i=1}^{N}|I(i)-I_i|^2$ is minimized.

For example, in case the local pieces of surfaces $f_j(x,y)$ are approximated by the main term of the Taylor expansion, i.e. by paraboloids, a nonzero intensity I(j) at point $(x_j, y_j)$ on the image plane only comes from what remains of the paraboloid of vertex $(x_j, y_j, z_j)$, i.e. paraboloid (j), after intersection with the remaining paraboloids forming the piecewise surface F having respective vertices $(x_i,y_i,z_i)$, $i \neq j$, $i \in \{1, \ldots, N\}$ (and possibly with the border of the caustic layer window). In case the paraboloid (j) is fully masked by at least one paraboloid (i) (i.e. if $z_i$ is large enough with respect to $z_j$), the intensity I(j) is zero. As mentioned above, the contour of intersection of two paraboloids (i) and (j) is a parabola in a plane perpendicular to the straight line joining the two points $(x_i,y_i)$ and $(x_j, y_j)$, this plane being parallel to the optical axis along z: the intersection of this plane with the (x,y) plane at z=0 defines a straight segment. When considering the intersections of the paraboloid (j) with the neighboring paraboloids (i), the corresponding straight segments on the plane z=0 delineate a convex polygonal cell $\Omega_j$. Clearly, the light intensity I(j) delivered at point $(x_j, y_j)$ of the image plane only results from the incoming (uniform) parallel rays collected by the cell $\Omega_j$ and thus, the delivered intensity I(j) is proportional to the area a(j) of cell $\Omega_j$. Of course, the sum of all the areas of the cells associated with the envelope of all the intersecting paraboloids must be equal to the full area A (on plane z=0) of collection of incoming light rays (window): $\Sigma_{i=1}^{N} a(i) = A$. This constraint is accounted for by choosing an appropriate normalization while (iteratively) minimizing the sum $S=\Sigma_{i=1}^{N}|I(i)-I_i|^2$. Each time the relative differences between heights of the vertices of the paraboloids are modified (by increasing or decreasing at least one of the N heights), the areas of the cells are modified accordingly: changing the heights of the vertices is thus equivalent to changing the areas of the cells. If the heights $z_i$ and $z_j$ of the respective vertices of the two paraboloids corresponding to two adjacent points $(x_i,y_i)$ and $(x_j, y_j)$ are modified, for example, by changing $z_j$ into $z_j + \delta z_j$ (the other heights being unchanged), the segment of boundary between the cell $\Omega_i$ (relating to the paraboloid (i)) and the cell $\Omega_j$ (relating to the paraboloid (j)) will move toward cell $\Omega_i$ if $\delta z_j$ is positive (i.e. area a(i) is reduced) and will move toward cell $\Omega_j$ if $\delta z_j$ is negative (i.e. area a(i) is increased). Moreover, as the intensities are proportional to the areas of the cells, minimizing the sum S is equivalent to minimizing the sum $\Sigma = \Sigma_{i=1}^{N}|a(i)-a_i|^2$, where $a_i$ is the area value corresponding to the target intensity $I_i$, $i=1, \ldots, N$. The area a(i) can be seen as a parameter associated with the cell $\Omega_i$, and varying the heights of the vertices of the paraboloids is equivalent to modifying the parameters of the cells forming a partition of the area A. Area a(j) results from the intersections of the paraboloids and can be calculated by means of the above mentioned trace function as (integration is performed over the (x,y) plane of area A):

$$a(j) = \int \int \prod_{i=1, i \neq j}^{N} H[f_j(x, y) - f_i(x, y)] dx dy.$$

The above reasoning with the example of paraboloid surfaces remains true even if the expression of the piece of surface directly derived from the stationarity of the optical path length is not approximated or is approximated by its Taylor expansion to any (even) order k>2 (as the resulting expression still describes a surface of revolution): at an iteration step n of the minimization operation, the set of values $\{z_i^{(n)}, i=1, \ldots, N\}$ determines a set of cells $\{\Omega_i^{(n)}, i=1, \ldots, N\}$ representative of the intersections of the N pieces of surfaces $\{z=f_i^{(n)}(x,y), i=1, \ldots, N\}$ and a corresponding set of cell areas $\{a^{(n)}(i), i=1, \ldots, N\}$ with $a^{(n)}(j)=\int\int \Pi_{i=1, i \neq j}^{N} H[f_j^{(n)}(x,y)-f_i^{(n)}(x,y)] dx dy$, the constraint is that $\Sigma_{i=1}^{N} a^{(n)}(i) = A$ and the cost function is $\Sigma_{i=1}^{N}|a^{(n)}(i) - a_i|^2$. The approximation of the light-redirecting surface is described by:

$$F^{(n)}(x, y) \sim \sum_{j=1}^{N} f_j^{(n)}(x, y) \prod_{i=1, i \neq j}^{N} H[f_j^{(n)}(x, y) - f_i^{(n)}(x, y)].$$

The process of minimizing the functional (i.e. the cost function) $\Sigma = \Sigma_{i=1}^{N}|a_i|^2$ can be performed according to any known minimization method like, for example, the (derivative-free) Nelder-Mead simplex method (J. A. Nelder and R. Mead, "A simplex method for function minimization", The Computer Journal, vol. 7 (4), 1965, pp 308-313). Of course, other derivative-free optimization methods can be used, e.g. the coordinate descent method (see: Stephen J. Wright, "Coordinate Descent Algorithms", Mathematical Programming, vol. 151 (1), June 2015, pp 3-34) or the Multilevel Coordinate Search ("MCS") method (see: W. Huyer and A.

Neumaier, "Global Optimization by Multilevel Coordinate Search", Journal of Global Optimization, vol. 14 (4), June 1999, pp 331-355).

According to the invention, and with the above piecewise representation of the light redirecting surface, the technical problem of calculating the light-redirecting surface of a caustic layer that is adapted to redirect incident light received from a light source to form a projected image containing a given caustic pattern (i.e. a given distribution of non-zero light intensity) of a target image is thus solved by:

providing a discrete representation of an input target image comprising a set P of N image pixels $p_i$ of coordinates $\{(x_i,y_i)\}, i=1, \ldots N$, in the image plane with associated nonzero target light intensities $\{I_i\}$ distributed within a given area of the target image and corresponding to a target caustic pattern of the target image;

computing a piecewise light-redirecting surface $z=F(x,y)$ of the caustic layer, with height z above the (x,y) coordinates plane, based on a representation of the light-redirecting surface by means of intersecting pieces of surfaces $f_i(x,y)$, $i=1, \ldots, N$, respectively obtained from the stationarity of the optical path length of rays refracted, or reflected, by the caustic layer and focused on points P(i) of the image plane of coordinates $(x_i,y_i)$, $i=1, \ldots, N$, wherein each piece of surface $z=f_i(x,y)$ is a surface of revolution around an axis passing through the point P(i) and having a vertex at point $(x_i,y_i,z_i)$, with height $z_i=f_i(x_i,y_i)$, $i=1, \ldots, N$, the piecewise light-redirecting surface associated with respective values of the heights of the N vertices being formed by the envelope of the intersections of the corresponding N pieces of surfaces;

for a given set of respective values of heights of the vertices of the N pieces of surfaces, calculating a corresponding set of values of light intensities $I(1), \ldots, I(N)$ which are respectively focused on the points $P(1), \ldots, P(N)$ by the caustic layer redirecting incident light via the associated piecewise light-redirecting surface; and calculating the respective values of the N heights of the N vertices of the corresponding N pieces of surfaces which minimize the differences between the respective values of calculated light intensities $I(1), \ldots, I(N)$ focused on the points $P(1), \ldots, P(N)$ via the associated light-redirecting surface and the respective corresponding values of the target light intensities $I_1, \ldots, I_N$.

For example, with the minimization of the cost function Σ via the simplex method of Nelder and Mead, the optimization starts with a set of N+1 points $Q(1), \ldots, Q(N+1)$, located at the vertices of a non-degenerate simplex S in the optimization N-dimensional space (i.e. the N heights $z_1, \ldots, z_N$) and the corresponding set of cost function values $\Sigma_{i=1}^{N+1} Q(i)$. The method then performs a sequence of transformations of the working simplex 5, aimed at decreasing the cost function values at its vertices. At each step the transformation is determined by computing one or more test points, together with their cost function values, and by comparing these cost function values with those at the current vertices, with the aim of substituting the worst vertex, i.e. the one with the largest cost function value, with a better one. The test points can be selected according to one out of four heuristics: (1) reflection or (2) expansion away from the worst vertex; or (3) shrinkage or (4) contraction towards the best vertex(es). The minimization terminates when the working simplex S has become sufficiently small or when the cost function values at the vertices are close enough. By means of the four heuristic transformations, the Nelder-Mead algorithm typically requires only one or two function evaluations at each step, while many other direct search methods use at least N cost function evaluations. An intuitive explanation of the Nelder-Mead algorithm is given in (Press, W H; Teukolsky, S A; Vetterling, W T; Flannery, B P (2007). "Section 10.5. Downhill Simplex Method in Multidimensions". Numerical Recipes: The Art of Scientific Computing (3rd ed.). New York: Cambridge University Press. ISBN 978-0-521-88068-8.): "The downhill simplex method now takes a series of steps, most steps just moving the point of the simplex where the function is largest ("highest point") through the opposite face of the simplex to a lower point. These steps are called reflections, and they are constructed to conserve the volume of the simplex (and hence maintain its nondegeneracy). When it can do so, the method expands the simplex in one or another direction to take larger steps. When it reaches a "valley floor," the method contracts itself in the transverse direction and tries to ooze down the valley. If there is a situation where the simplex is trying to "pass through the eye of a needle," it contracts itself in all directions, pulling itself in around its lowest (best) point."

According to a preferred mode of the invention, the optimal light-redirecting surface is advantageously obtained by means of the (generalized) power diagram method (also known as the Voronoi diagram method or the Laguerre/Voronoi diagram method (see F. de Goes et al., "Blue Noise through Optimal Transport", CAN Transactions on Graphics, vol. 31 (6), (SIGGRAPH Asia) 2012) (see also the web site http://www.geometry.caltech.edu/BlueNoise/, with available source code). Indeed, this method is powerful and it is proven that, in a case corresponding to the optimization problem of the invention, the power diagram method as a unique solution " . . . for any prescribed capacity constraints", as minimizing a concave function of the weights, the weights $w_i$ corresponding here to the heights $z_i$ and the capacities $m_i$ corresponding here to the cell areas a(i) (see particularly the appendix of the above cited paper of de Goes et al.).

Since any image can be approximated by a finite collection of pixels, a caustic surface can be approximated by the composition of the corresponding pieces of surfaces (e.g. paraboloids). Hence, given a target image $I_t(x', y')$ (see FIG. 4) the problem of calculating the caustic surface that generates it reduces to finding the appropriate set of weights $\{w_i\}$ for a given set of points approximating $I_t(x', y')$.

Under the hypothesis of optimum transport (see the above mentioned article of de Goes et al.), this is equivalent to finding the weights $\{w_i\}$ (here heights $\{z_i\}$) for the power diagram of the sites $\{(x_i,y_i)\}$, such that the capacities $\{m_i\}$ (here cell areas $\{a(i)\}$) are proportional to the target image intensities $\{I_t(x_i,y_i)\}$. Once an optimal set of heights $\{z_i, i=1, \ldots, n\}$ and the corresponding cell boundaries $\partial \Omega_i$ (of cells $\Omega_i$ of areas a(i)), are obtained via the power diagram method, the piecewise surface is reconstructed by considering the intersections of the cylinders, built along the axis z and of which bases are formed by the boundaries of the cells, with the respective pieces of surfaces with vertices at said obtained heights. In a preferred mode, the pieces of surfaces are approximated by paraboloids: in this case the boundary $\partial \Omega_i$ of a cell $\Omega_i$ is polygonal and calculations of distances of a point to the boundary and gradients are greatly simplified. In more general case (i.e. the pieces of surfaces are not approximated, or are approximated via a Taylor expansion of order greater than 2), a boundary $\partial \Omega_i$ of a cell $\Omega_i$ is still a closed curve but composed of curved lines, and the above mentioned calculations of distances of a point to the boundary and gradients are more complex.

Figure 4:
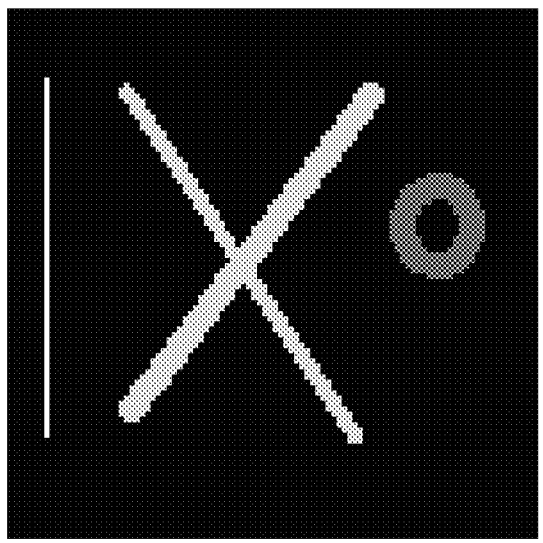
FIG. 4 illustrates a target image.
Figure 5:
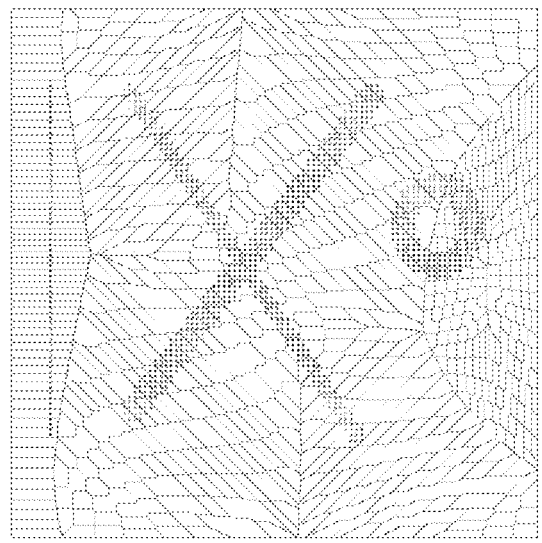
FIG. 5 illustrates a generalized power diagram.
Figure 6:
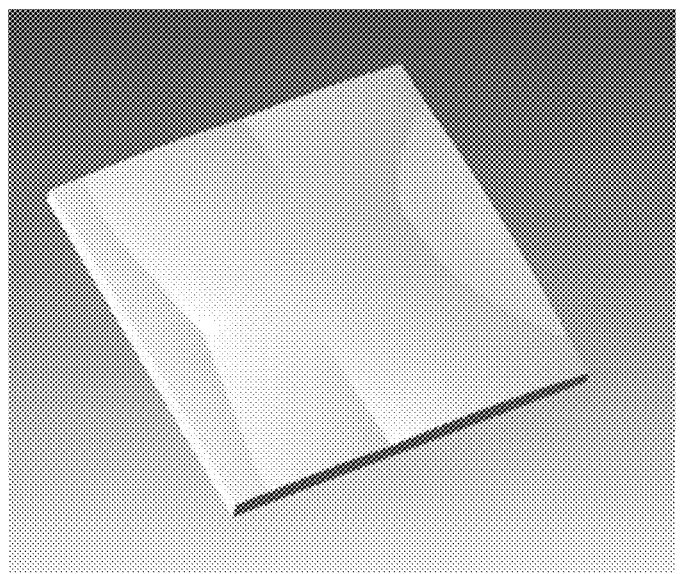
FIG. 6 illustrates a view of the caustic surface.
Figure 7:
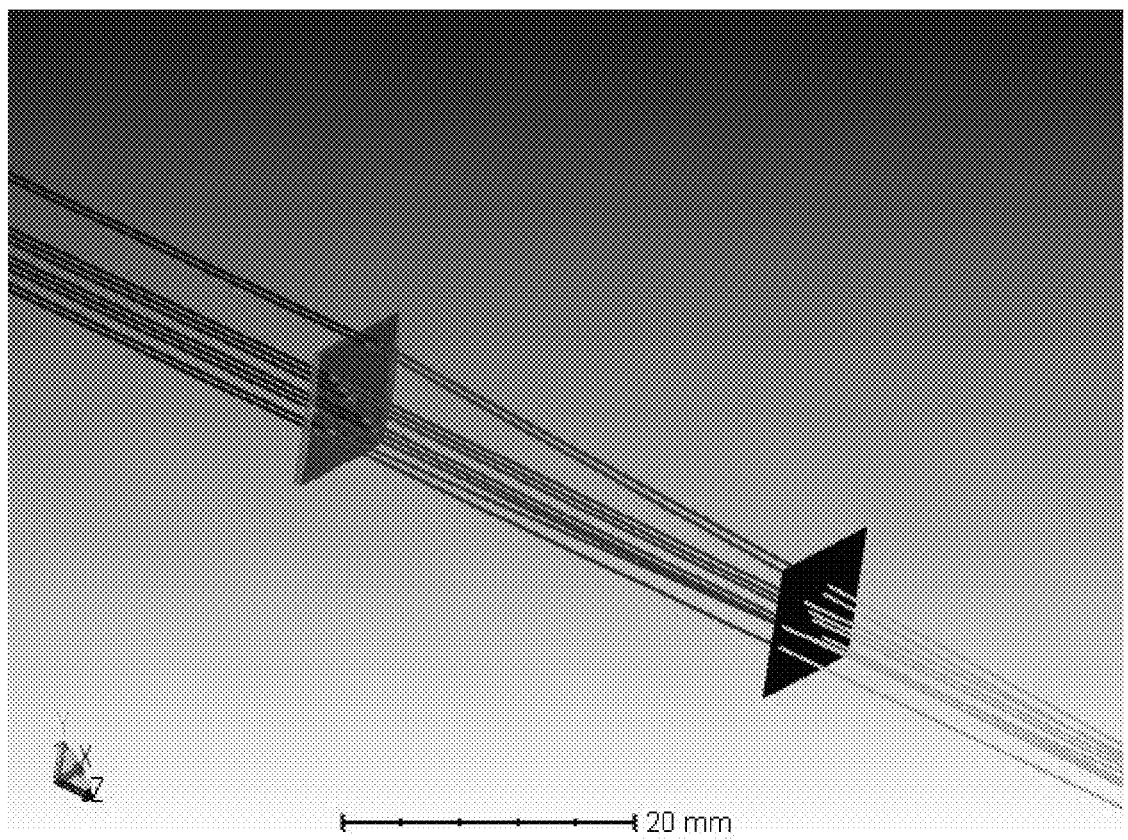
FIG. 7 illustrates a side view of an object in front of the detector (raytracing geometry).
Figure 8:
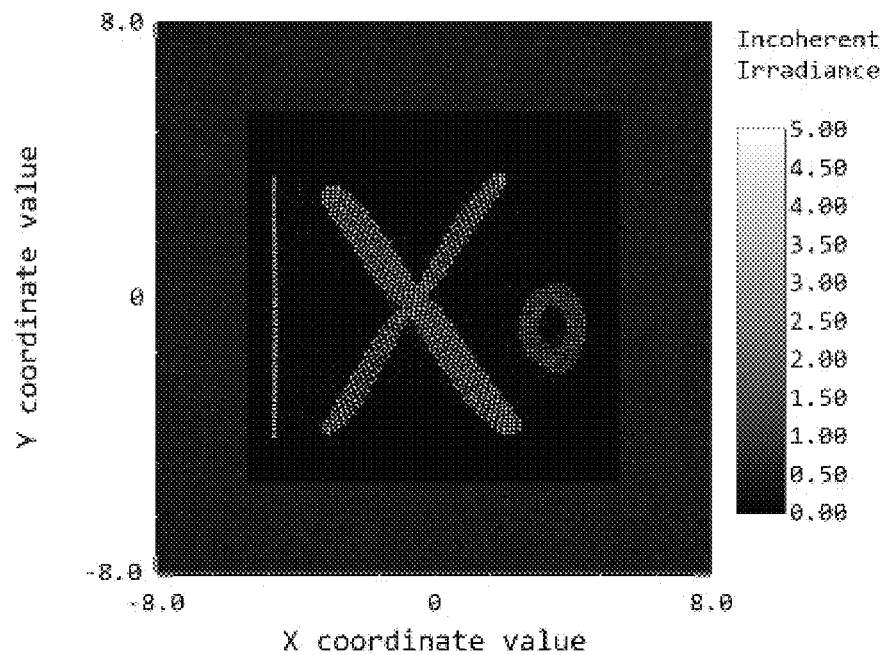
FIG. 8 illustrates raytracing simulation in grayscale of the image at 40 mm from the object.
Figure 8:
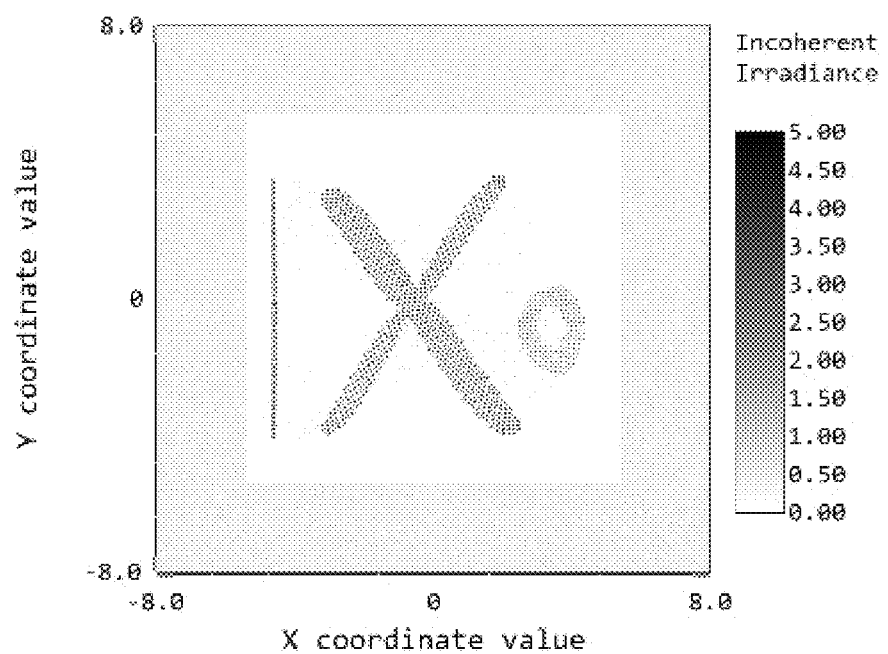

The results obtained for the target image depicted on FIG. 4 are shown in FIGS. 5 to 8. The target image has 100×100 pixels, of which 900 are non-zero (i.e. represent areas of the caustic image with nonzero luminous intensity). FIG. 5 shows the calculated power diagram; FIG. 6 illustrates the corresponding caustic surface, FIG. 7 shows the raytracing geometry, and FIG. 8 depicts the results of the raytracing.

Minimizing over the $w_i$ the functional $\Sigma_i |m_i - I_i|^2$ can be solved by a mere gradient descent algorithm. The process starts from an initial set of $\{w_i\}$ (most often by taking all the values equals), and then converges towards an optimal set $\{w_i\}$ of a corresponding partition into cells $\Omega_i$ of capacities mi. Then from the resulting optimal set $\{w_i\}$ the set of heights of the paraboloid elements $\{z_i\}$ is obtained, and from the boundaries $\partial\Omega i$ of the resulting polygonal cells $\Omega_i$, by intersection of the vertical (along z) cylinders of basis $\partial\Omega i$ with the paraboloids, the final piece-wise caustic surface is built.

The caustic layer having the light-redirecting surface computed and designed according to the present invention forms a projected image that comprises a caustic pattern reproducing a reference pattern that is easily recognizable by a person, using no further means (i.e. with naked eye) or common and easily available means, so that an object marked with this optical security element can be readily authenticated visually by the person. The transparent aspect of the refractive optical security element makes it particularly suitable for marking at least partially transparent substrates (e.g. glass or plastic bottles, bottle caps, watch glasses, jewelry, gems, etc.).

The disclosed method for designing a refractive transparent or partially transparent light-redirecting surface, or a reflective light-redirecting surface, of a caustic layer is fast, scaled, reliable and accurate. It enables to significantly reduce the number of iterations required to go from a target image to the corresponding surface, since no corrections or adjustments are required. This also reduces the overall time required for designing.

Also, a step of calculating and integrating the normal field is eliminated and efficient optimization technique via minimization of capacity constraints is provided.

Besides, user intervention beyond that of specifying the target image and accepting the resulting surface is fully eliminated. Removing the need for user intervention significantly simplifies the implementation of the method in a production context, where specialized skills are not necessarily available.

The above disclosed subject matter is to be considered illustrative, and not restrictive, and serves to provide a better understanding of the invention defined by the independent claims.

The invention claimed is:

1. A method of forming a caustic layer having a relief pattern formed on a lens element and adapted to redirect incident light received from a light source and to form a projected image containing a caustic pattern, the method comprising computer implemented steps of:

providing a discrete representation of an input target image comprising a set P of N image pixels $p_i$ of coordinates $\{(x_i, y_i)\}$ in an image plane with associated nonzero target light intensities $\{I_i\}$, i=1, ..., N, distributed within a given area of the input target image and corresponding to a target caustic pattern of the input target image;

computing a piecewise representation of a light-redirecting surface z=F(x,y) of the caustic layer, with height z above an (x,y) coordinates plane, based on a representation of the light-redirecting surface by intersecting pieces of surfaces $z=f_i(x,y)$, i=1, ..., N, respectively obtained from stationarity of an optical path length of rays refracted, or reflected, by the caustic layer and focused on points P(i) of the image plane of coordinates $(x_i, y_i)$, i=1, ..., N, wherein each piece of surface $z=f_i(x,y)$ is a surface of revolution around an axis passing through a point P(i) and having a vertex at point $(x_i, y_i, z_i)$, with height $z_i = f_i(x_i, y_i)$, i=1, ..., N, the piecewise representation of the light-redirecting surface associated with respective values of the heights of the N vertices being formed by an envelope of intersections of the corresponding N pieces of surfaces $z=f_i(x,y)$, i=1, ..., N;

for a given set of respective values of heights $z_1, \ldots, z_N$ of the vertices of the N pieces of surfaces, calculating a corresponding set of values of light intensities I(1), ..., I(N) which are respectively focused on points P(1), ..., P(N) by the caustic layer redirecting incident light via the associated piecewise light-redirecting surface; and calculating the respective values of the N heights $z_1, \ldots, z_N$ of the N vertices of the corresponding N pieces of surfaces that causes the differences between the values of calculated light intensities I(1), ..., I(N) focused on the points P(1), ..., P(N) via the associated light-redirecting surface and the respective corresponding values of the target light intensities $I_1, \ldots, I_N$ to be minimized to a least value as a result of calculating the respective values of the N heights $z_1, \ldots, z_N$; and forming the caustic layer having the light-redirecting surface with the calculated values of the N heights $z_1, \ldots, z_N$ of the N vertices of the corresponding N pieces of surfaces on an optical material substrate.

2. The method according to claim 1, wherein each piece of surface $z=f_i(x,y)$, i=1, ..., N, is approximated by taking, within the paraxial approximation, a Taylor expansion of order k greater or equal than two of the expression of the piece of surface obtained from the stationarity of the optical path length.

3. The method according to claim 1, wherein the step of calculating the heights $z_i$ minimizing the differences between the calculated light intensities I(i) and the corresponding target light intensities $I_i$, for i=1, ..., N, is performed by means of a gradient-free optimization method.

4. The method according to claim 1, wherein the step of calculating the heights $z_i$ minimizing the differences between the values of the calculated light intensities I(i) and the corresponding value of the target light intensities $I_i$, for i=1, ..., N, to zero is performed by means of an optimization method resorting to a power diagram for the computation of an associated cost function and its derivatives.

5. The method according to claim 1, wherein the designed light-redirecting surface is used to generate a machine-compatible representation for controlling a machining tool.

6. The method according to claim 1, wherein the designed light-redirecting surface is a master light-redirecting surface to be used to build a replica of the light-redirecting surface.

7. The method according to claim 5, further comprising replicating the light-redirecting surface on a substrate.

8. The method according to claim 6, wherein replicating the light-redirecting surface on a substrate comprises one of roll-to-roll, foil-to-foil, UV casting, and embossing.

* * * * *